United States Patent
Cyran et al.

(10) Patent No.: US 7,612,520 B2
(45) Date of Patent: Nov. 3, 2009

(54) METHOD FOR OPERATING A DELTA WOUND THREE-PHASE PERMANENT MAGNET BRUSHLESS MOTOR

(75) Inventors: Curtis P. Cyran, Dayton, OH (US);
Robert J. Disser, Dayton, OH (US)

(73) Assignee: Delphi Technologies, Inc., Troy, MI (US)

( * ) Notice: Subject to any disclaimer, the term of this patent is extended or adjusted under 35 U.S.C. 154(b) by 421 days.

(21) Appl. No.: 11/713,839

(22) Filed: Mar. 5, 2007

(65) Prior Publication Data
US 2008/0218119 A1    Sep. 11, 2008

(51) Int. Cl.
*H02P 21/00*    (2006.01)
(52) U.S. Cl. .................... 318/806; 318/727; 318/767
(58) Field of Classification Search ............. 318/806, 318/767, 727
See application file for complete search history.

(56) References Cited

U.S. PATENT DOCUMENTS

| | | | |
|---|---|---|---|
| 6,304,053 B1 * | 10/2001 | Johnson | 318/771 |
| 6,426,603 B1 * | 7/2002 | Johnson | 318/434 |
| 6,680,997 B2 * | 1/2004 | Das | 318/400.09 |
| 6,894,455 B2 * | 5/2005 | Cai et al. | 318/771 |
| 7,042,189 B2 * | 5/2006 | Hossain et al. | 318/400.15 |

* cited by examiner

*Primary Examiner*—Bentsu Ro
*Assistant Examiner*—David S Luo
(74) *Attorney, Agent, or Firm*—Thomas N. Tworney (57) ABSTRACT

Method for operating a delta wound three-phase permanent magnet brushless motor. A transition speed is determined in a quadrant of a speed versus torque curve above which speed continues to increase while current/torque decreases wherein actual phase current can be controlled in a current control modification manner which reduces requested phase current. The modification manner is determined for a quadrant, wherein a controller can use the modification manner to reduce the requested phase current to control the actual phase current when the speed is above the transition speed. The motor is controlled in a quadrant wherein, when the motor has a speed above the transition speed, the controller reduces the requested phase current in the modification manner and the controller supplies the actual phase current to the motor using the reduced requested phase current and using measured phase current of the motor derived from using a single current sense resistor.

20 Claims, 4 Drawing Sheets

METHOD FOR OPERATING A DELTA WOUND THREE-PHASE PERMANENT MAGNET BRUSHLESS MOTOR

TECHNICAL FIELD

The present invention relates generally to motors, and more particularly to a method for operating a delta wound three-phase permanent magnet brushless motor.

BACKGROUND OF THE INVENTION

Conventional motors include delta wound three-phase permanent magnet brushless motors. Conventional motor controllers for delta wound three-phase permanent magnet brushless motors monitor current for the motor based at least on a measured phase current, wherein the measured phase current is derived from using a single current sense resistor. See U.S. Pat. No. 6,262,544. The motor controller uses the measured phase current to control the amount of current supplied to the motor. However, after each motor commutation, the current measurement derived from a single current sense resistor provides an inaccurately low measured phase current due to recirculating currents in the motor windings. The winding topology of a delta wound three-phase permanent magnet brushless motor allows the current in at least one of the motor phases to improperly increase during the period of inaccurately low measured phase current. Such motor control has a tendency to create a field in a phase winding strong enough to demagnetize the permanent magnets of the rotor of the brushless motor and strong enough to cause excessive thermal stress in the motor and the motor controller when the motor operates in the second and/or fourth quadrants of a motor speed versus motor torque curve of the motor.

What is needed is an improved method for operating a delta wound three-phase permanent magnet brushless motor using a single current sense resistor.

SUMMARY OF THE INVENTION

A method of the invention is for operating a delta wound three-phase permanent magnet brushless motor and includes several steps. One step includes determining a transition motor speed of the motor in a quadrant of a motor speed versus motor torque curve of the motor above which motor speed continues to increase while motor current/torque decreases wherein actual phase current supplied to the motor can be controlled by a motor controller in a current control modification manner which reduces requested phase current for the motor. Another step includes determining the current control modification manner for a quadrant of the motor speed versus motor torque curve, wherein the motor controller can use the current control modification manner to reduce the requested phase current to control the actual phase current when the motor speed is above the transition motor speed. Another step includes controlling the motor in a quadrant of the motor speed versus motor torque curve with the motor controller wherein, when the motor has a motor speed above the transition motor speed, the motor controller reduces the requested phase current in the current control modification manner and the motor controller supplies the actual phase current to the motor based upon closed loop control using the reduced requested phase current and using measured phase current of the motor derived from using a single current sense resistor.

Several benefits and advantages are derived from the method of the invention. In one example, reducing the requested phase current of the motor controller, when the delta wound three-phase permanent magnet brushless motor is operating in the second or fourth quadrant at a particular motor speed above the transition motor speed, reduces the possibility for demagnetization of the permanent magnets of the rotor of the motor. In the same or a different example, reducing the requested phase current of the motor controller, when the delta wound three-phase permanent magnet brushless motor is operating in the second or fourth quadrant at a particular motor speed above the transition motor speed, reduces the possibility for causing excessive thermal stress in the motor and the motor controller. In the same or a different example, having a motor controller which uses a single current sense resistor reduces the complexity and expense of motor current sensing.

DETAILED DESCRIPTION

Referring to FIGS. 1-4, a method of the invention is for operating a delta wound three-phase permanent magnet brushless motor 10 and includes steps a) through c). Step a) includes determining a transition motor speed 22 of the motor 10 in a quadrant 12, 26, 14 and 28 of a motor speed versus motor torque curve 16 of the motor 10 above which motor speed 24 continues to increase while motor current/torque decreases wherein actual phase current 30 supplied to the motor 10 can be controlled by a motor controller 18 in a current control modification manner which reduces requested phase current 48 for the motor 10. Step b) includes determining the current control modification manner for a quadrant 12, 26, 14 and 28 of the motor speed versus motor torque curve 16, wherein the motor controller 18 can use the current control modification manner to reduce the requested phase current 48 to control the actual phase current 30 when the motor speed 24 is above the transition motor speed 22. Step c) includes controlling the motor 10 in a quadrant 12, 26, 14 and 28 of the motor speed versus motor torque curve 16 with the motor controller 18 wherein, when the motor 10 has a motor speed 24 above the transition motor speed 22, the motor controller 18 reduces the requested phase current 48 in the current control modification manner and the motor controller 18 supplies the actual phase current 30 to the motor 10 based upon closed loop control using the reduced requested phase current 50 and using measured phase current 54 of the motor 10 derived from using a single current sense resistor 20.

It is noted that an increase in motor speed 24 means an increase in the absolute value of motor speed 24 and that a decrease in motor current/torque means a decrease in the absolute value of actual phase current and the absolute value of motor torque. It is also noted that a reduction in the requested phase current 48 is a reduction in the absolute value of the requested phase current 48. It is additionally noted that "when the motor speed 24 is above/below the transition motor speed 22" means "when the absolute value of the motor speed 24 is above/below the absolute value of the transition motor speed 22". It is further noted that the motor 10 of step c) is the same motor or the same-model motor as the motor of step a). In one enablement of the method, steps a) and b) are performed in a laboratory environment using a motor dynamometer and the application requirements of the motor 10. In the same or a different enablement, step c) is performed in an application environment or on a motor dynamometer. In one utilization of the method, step c) does not degrade the performance of the motor speed versus motor torque curve 16 of the motor 10.

Figure 1:
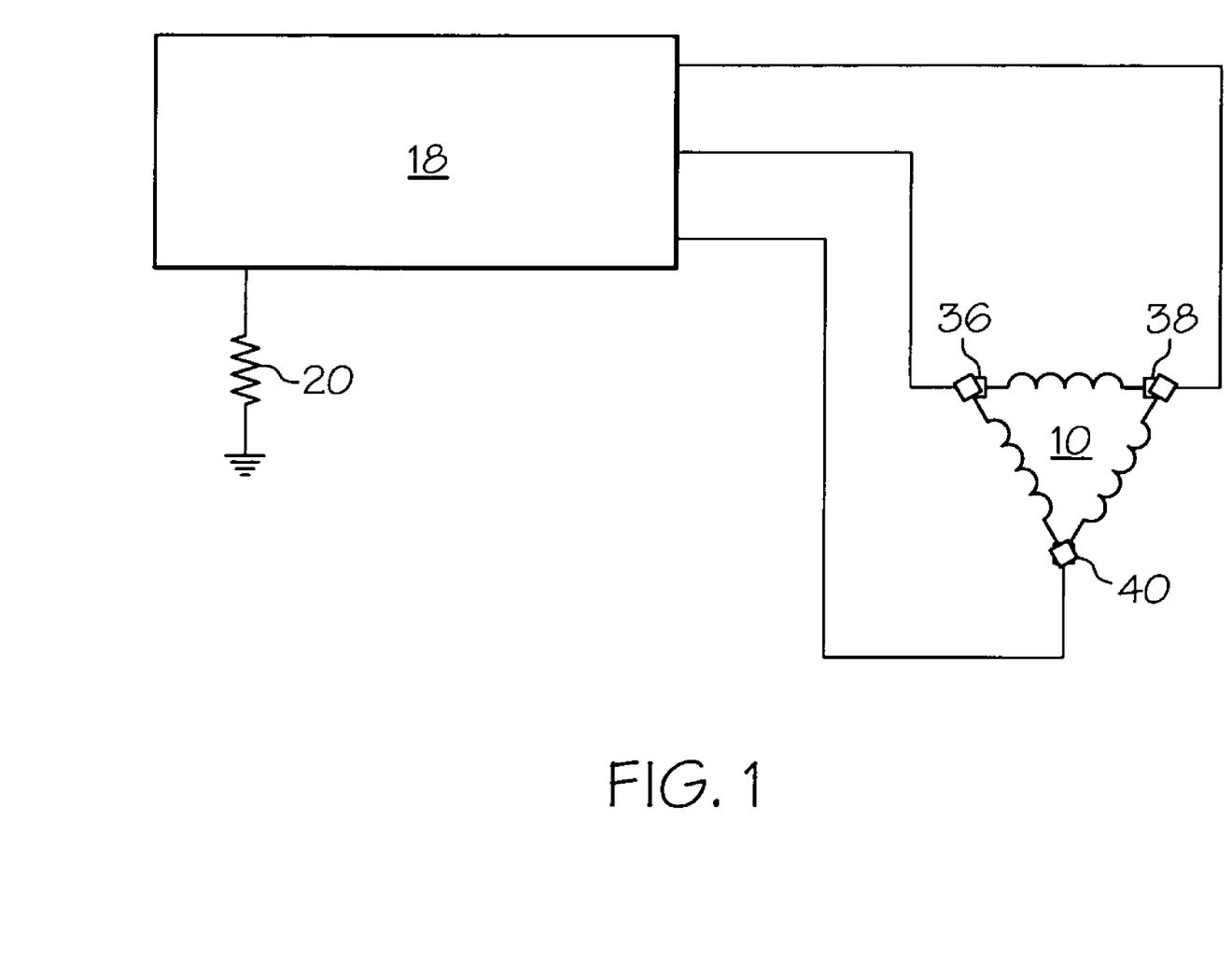
FIG. 1 is a schematic diagram of an embodiment of a motor controller and a delta wound three-phase permanent magnet brushless motor, wherein the motor controller uses a single current sense resistor to measure phase current of the motor.

FIG. 1 illustrates an example of a connection relationship between the motor controller 18, the delta wound three-phase permanent magnet brushless motor 10, and the single current sense resistor 20. In one example, the single current sense resistor 20 provides a measured phase current 54 of the motor 10 to the motor controller 18. Phase A of the motor 10 is denoted by 36, phase B of the motor 10 is denoted by 38, and phase C of the motor 10 is denoted by 40 wherein wires (not labeled) connect the motor controller 18 to the phases 36, 38, and 40 of the motor 10. In one construction, the single current sense resistor 20 is part of the motor controller 18. In one arrangement, the single current sense resistor 20 is located between the power output devices (not shown) of the motor controller 18 and the power return of the motor controller 18. The motor controller 18 controls the actual phase current 30 supplied to the motor 10 based upon a requested phase current 48 from another control source (e.g., a user request or a higher level control loop) and the measured phase current 54 from the single current sense resistor 20. It is noted that a conventional motor controller would receive the requested phase current 48 and use well known closed loop control methods to supply the actual phase current 30 to the motor 10 for all motor speeds 24 based upon a closed loop control comparison between the requested phase current 48 and the measured phase current 54. The motor controller 18 of the method of the invention uses step c) to control the actual phase current 30 of the motor 10 based upon the requested phase current 48, the transition motor speed 22 determined in step a), the current control modification manner determined in step b), and the measured phase current 54 from the single current sense resistor 20.

Figure 2:
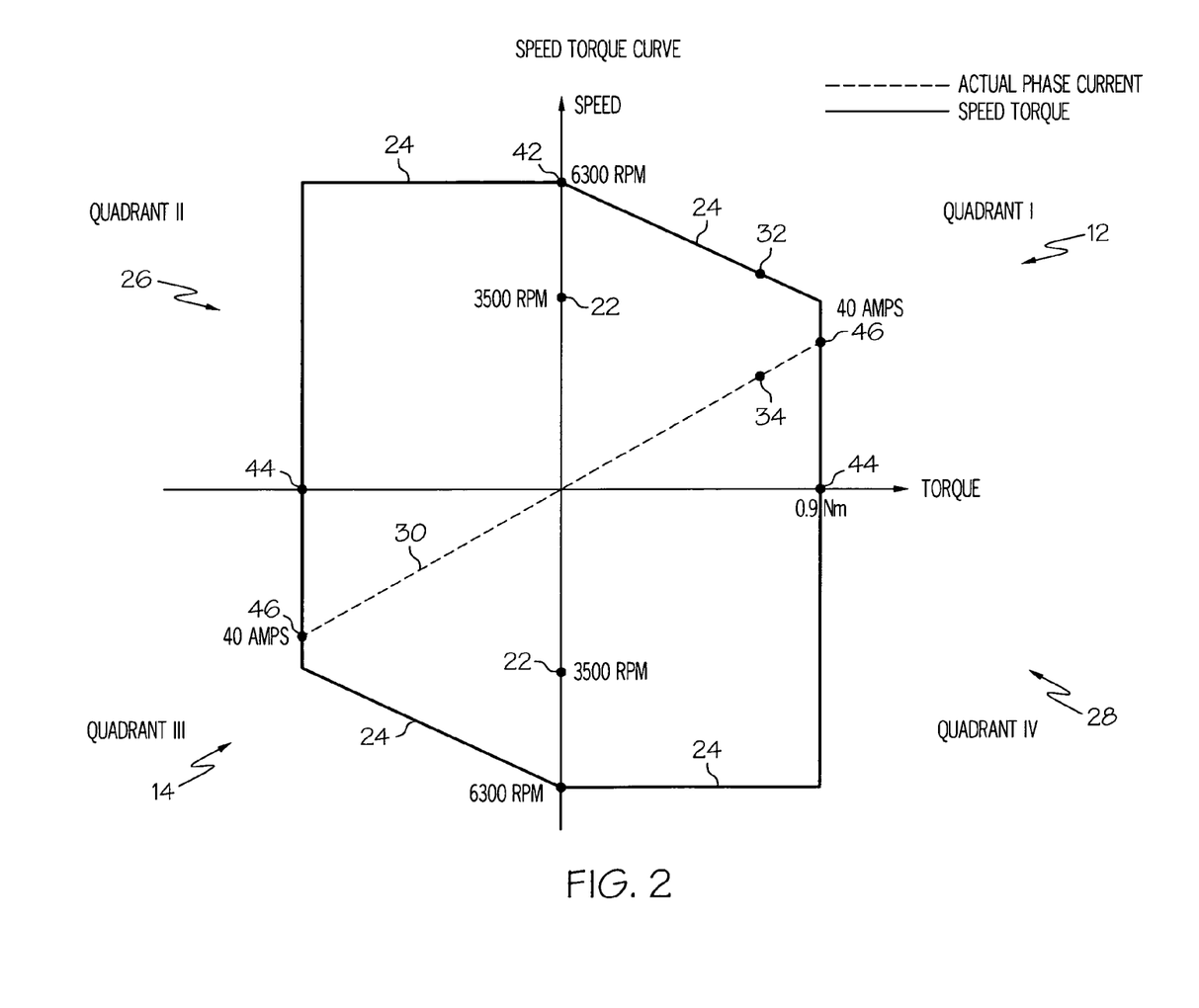
FIG. 2 is a graph of an example (which happens to be an idealized example) of a motor speed versus motor torque curve for the motor of FIG. 1, wherein the graph illustrates the four quadrants of motor operation and wherein the graph also shows actual phase current in the first and third quadrants.

FIG. 2 illustrates an example of a motor speed versus motor torque curve 16 of the motor 10. The first quadrant 12 has positive motor torque and positive motor speed. The second quadrant 26 has negative motor torque and positive motor speed. The third quadrant 14 has negative motor torque and negative motor speed. The fourth quadrant 28 has positive motor torque and negative motor speed. It is understood that the motor 10 operates in only one quadrant 12, 26, 14 and 28 at a time.

In one extension of the method, the method also includes step d), wherein step d) includes controlling the motor 10 in a quadrant 12, 26, 14 and 28 of the motor speed versus motor torque curve 16 with the motor controller 18, wherein, when the motor 10 has a motor speed 24 below the transition motor speed 22, the motor controller 18 supplies the actual phase current 30 to the motor 10 based upon closed loop control using the requested phase current 48 and using the measured phase current 54.

In a first elaboration of the extension of the method, the method also includes step e), wherein step e) includes controlling the motor 10 in a quadrant 12, 26, 14 and 28 of the motor speed versus motor torque curve 16 with the motor controller 18, wherein, when the motor 10 has a motor speed 24 equal to the transition motor speed 22, the motor controller 18 supplies the actual phase current 30 to the motor 10 based upon closed loop control using the reduced requested phase current 50 and using the measured phase current 54. In a second elaboration, the method also includes step e), wherein step e) includes controlling the motor 10 in a quadrant 12, 26, 14 and 28 of the motor speed versus motor torque curve 16 with the motor controller 18, wherein, when the motor 10 has a motor speed 24 equal to the transition motor speed 22, the motor controller 18 supplies the actual phase current 30 to the motor 10 based upon closed loop control using the requested phase current 48 and using the measured phase current 54.

In one modification of the extension of the method, the quadrant 12, 26, 14 and 28 of step d) is the same as the quadrant 12, 26, 14 and 28 of step c). In a first example, the quadrant 12, 26, 14 and 28 of step c) is the first quadrant 12. In a second example, the quadrant 12, 26, 14 and 28 of step c) is the second quadrant 26. In a third example, the quadrant 12, 26, 14 and 28 of step c) is the third quadrant 14. In a fourth example, the quadrant 12, 26, 14 and 28 of step c) is the fourth quadrant 28.

In a first employment of the method, the quadrant 12, 26, 14 and 28 of step c) is the same as the quadrant 12, 26, 14 and 28 of step b), and the quadrant 12, 26, 14 and 28 of step b) is the same as the quadrant of step a). In one variation, the quadrant 12, 26, 14 and 28 of step c) is the second or fourth quadrant 26 or 28 but is not the first quadrant 12 and is not the third quadrant 14.

In a second employment of the method, the quadrant 12, 26, 14 and 28 of step c) is the same as the quadrant 12, 26, 14 and 28 of step b), and the quadrant 12, 26, 14 and 28 of step c) is different from the quadrant 12, 26, 14 and 28 of step a). In one variation, the quadrant 12, 26, 14 and 28 of step c) is the second or fourth quadrant 26 or 28 but is not the first quadrant 12 and is not the third quadrant 14.

In a third employment of the method, the quadrant 12, 26, 14 and 28 of step c) is different from the quadrant 12, 26, 14 and 28 of step b).

In a first illustration of the method, the motor controller 18 in step c) uses the reduced requested phase current 50 only for a predetermined time substantially immediately following a motor commutation when the motor speed 24 is above the transition motor speed 22. In a second illustration, the motor controller 18 in step c) uses the reduced requested phase current 50 continuously when the motor speed 24 is above the transition motor speed 22.

In a first enactment of the method, the reduced requested phase current 50 is the same for any quadrant 12, 26, 14 and 28 for the same requested phase current 48, the same motor speed 24, and the same transition motor speed 22. In a second enactment, the reduced requested phase current 50 is the same for the second and fourth quadrants 26 and 28 for the same requested phase current 48, the same motor speed 24, and the same transition motor speed 22. In a third enactment, the reduced requested phase current 50 is the same for the first and third quadrants 12 and 14 for the same requested phase current 48, the same motor speed 24, and the same transition motor speed 22. In a fourth enactment, the reduced requested phase current 50 is different for each quadrant 12, 26, 14 and 28 for the same requested phase current 48, the same motor speed 24, and the same transition motor speed 22.

Figure 3:
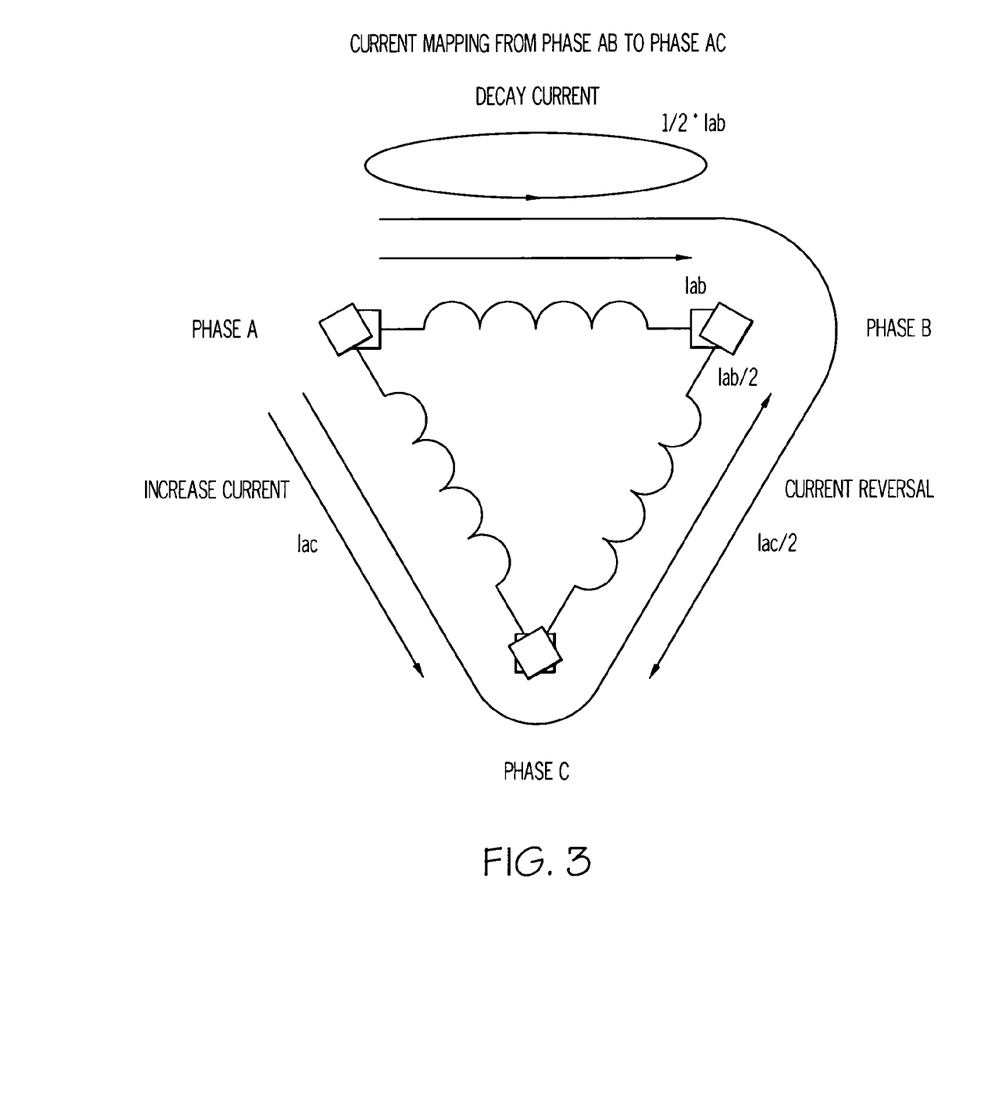
FIG. 3 is an explanatory diagram illustrating an example of phase current mapping from phase AB to phase AC for the motor of FIG. 1.

FIG. 3 illustrates an example of the windings of a delta wound permanent magnet brushless motor 10 and the actual phase currents 30 of the motor 10 during a commutation event from commutation state phase AB to commutation state phase AC. Assume the requested phase current 48 remains constant from one commutation state to the next. With this assumption, the magnitude of (Iab) and (Iac) will be nearly the same under steady state conditions at some time following the transient recirculating current decay after the commutation event. Also assume the motor 10 is operating at a constant rotational speed in the first quadrant 12. With this assumption, the back emf (electromotive force) of the motor 10 is constant and the actual phase current 30 equals (applied PWM voltage minus back emf) divided by motor resistance. It is noted that the third quadrant 14 operates the same as the first quadrant 12.

Starting with commutation state phase AB, motor controller 18 connects phase B 38 of the motor 10 to the single current sense resistor 20 using power transistors (not shown). Additionally, motor controller 18, in one example, applies a pulse width modulated (PWM) voltage to phase A 36 of the motor 10 using power transistors (not shown). The power transistors (not shown) controlling phase C 40 are turned off and in a high impedance. This condition causes current flow from phase A 36 to phase B 38 directly (Iab) and current flow from phase A 36 to phase C 40 to phase B 38 (Iab/2). Since phase B 38 is connected to the single current sense resistor 20, the single current sense resistor 20 provides a measured phase current 54 of (Iab+Iab/2=3/2*Iab) to the motor controller 18.

At the time of the commutation event, the motor controller 18 exits commutation state phase AB and enters commutation state phase AC. The power transistors (not shown) controlling phase B 38 turn off and become a high impedance. Motor controller 18 connects phase C 40 of the motor 10 to the single current sense resistor 20 using power transistors (not shown). Motor controller 18 continues, in the example, to apply a PWM voltage to phase A 36 of the motor 10 using power transistors (not shown). Due to the inductive nature of the motor windings, the currents flowing in the phases are not able to instantaneously change. The current flowing from phase A 36 to phase B 38 must decay from (Iab) to (Iac/2) or to half of the original value. The current flowing from phase A 36 to phase C 40 must increase from (Iab/2) to (Iac) or double the original value. The current flowing from phase C 40 to phase B 38 must go from (Iab/2) to (Iac/2) or decay to zero and increase to the same value in the opposite direction. The decay of the current flowing from phase A 36 to phase B 38 is illustrated by the circular decay current. This current circulates in the phase winding of the motor 10 and the motor controller 18 but does not flow through the single current sense resistor 20. Since phase C 40 is connected to the single current sense resistor 20, the current flowing from phase A 36 to phase C 40 flows through the single current sense resistor 20, but this current is offset by the decaying current flowing from phase C 40 to phase B 38.

Due to the transient recirculating currents, the measured phase current 54 provided to the motor controller 18 by the single current sense resistor 20 is not equal to the actual phase current 30 in the motor 10 until after the transient recirculating currents go to zero. At very low rotational speeds of the motor 10, the transient recirculating current condition exists for a relatively short period of time compared to the time duration of each commutation state. Therefore, at very low rotational speeds the measured phase current 54 provided to the motor controller 18 by the single current sense resistor 20 is almost always equal to the actual phase current 30 of the motor 10.

As the rotational speed of the motor 10 increases, the percent of the transient recirculating current time with respect to the time duration of each commutation state becomes more significant. As the rotational speed of the motor 10 approaches free speed 42, the transient recirculating current approaches 100 percent of the time duration of each commutation state. In this situation, the measured phase current 54 provided by the single current sense resistor 20 to the motor controller 18 is significantly less than the actual phase current 30 of the motor 10.

Due to the assumption that the motor 10 is operating in the first quadrant 12, the maximum actual phase current 30 equals (battery voltage minus back emf) divided by motor resistance and the maximum rate of current rise (di/dt) equals (battery voltage minus back emf) divided by motor inductance. As the rotational speed of the motor 10 approaches free speed 42, the back emf of the motor 10 is nearly equal to the applied PWM voltage which is equal to the battery voltage in the maximum current condition. Since the maximum actual phase current 30 and the maximum rate of current rise (di/dt) are controlled by (battery voltage minus back emf) and the back emf of the motor 10 is nearly equal to battery voltage at free speed 42, the motor 10 provides a limit to maximum current error conditions when the motor 10 approaches free speed 42, which is the point at which the largest error between the measured phase current 54 provided by the single current sense resistor 20 to the motor controller 18 and the actual phase current 30 of the motor 10 should exist.

Operation of the motor 10 in the second quadrant 26 presents the same error situation due to transient recirculating currents immediately following a commutation event with one significant exception. It is noted that the fourth quadrant 28 operates the same as the second quadrant 26. In the second quadrant 26, the actual phase current 30 equals (applied PWM voltage plus back emf) divided by motor resistance. As the rotational speed of the motor 10 approaches free speed 42, the back emf of the motor 10 is nearly equal to the applied PWM voltage. In the second quadrant, the maximum actual phase current 30 equals (battery voltage plus back emf) divided by motor resistance or nearly (2*battery voltage) divided by motor resistance. The maximum rate of current rise (di/dt) is nearly equal to (2*battery voltage) divided by motor inductance.

In the second quadrant 26, the motor 10 does not provide a limit to the maximum error condition when the inaccuracy between the measured phase current 54 provided by the single current sense resistor 20 to the motor controller 18 and the actual phase current 30 of the motor 10 is the largest. In fact, the error condition is amplified in the second quadrant 26 of the motor speed versus motor torque curve 16 of the motor 10.

The method of the invention uses steps a) through c) to control the actual phase current 30 of the motor 10 to account for the inaccurately measured phase current 54 in the single current sense resistor 20 compared to the actual phase current 30 in the motor 10 following a commutation event. The details of an example of steps a) through c) are explained by referring to FIG. 2. Steps a) through c) may be iterative to determine the proper value of the transition motor speed 22 of step a), the current control modification manner of step b), and to confirm that these selected values do not degrade the performance of the motor speed versus motor torque curve 16 of motor 10 in step c).

A first implementation of an example of the method of the invention uses the motor speed versus motor torque curve 16 of the motor 10 in FIG. 2 and the application requirements of the motor 10 to determine the transition motor speed 22 in step a). The motor speed versus motor torque curve 16 of the motor 10 may be developed and evaluated in a laboratory environment using a motor dynamometer over the operating conditions of at least operating voltage of the motor 10. The application requirements of the motor 10 specify the operating conditions of at least the operating voltage of the motor 10.

In the first implementation, the transition motor speed 22 remains the same in all four quadrants 12, 26, 14 and 28 to simplify the motor controller 18. In one illustration, the transition motor speed 22 is determined in the first quadrant 12 and is considered to be the same for the second, third and fourth quadrants 26, 14 and 28 which is equivalent to saying that step c) uses the transition motor speed determined in the first quadrant 12 for the second, third and fourth quadrants 26, 14 and 28. The application requirements of the motor 10 specify the maximum torque the motor 10 must provide in at least the first quadrant 12, the second quadrant 26, the third quadrant 14, or the fourth quadrant 28. Assume that the torque requirement is the same in all four quadrants 12, 14, 26, and 28 for this discussion although this is not necessarily valid for all applications. The maximum torque required by the motor 10 is denoted by 44. From the motor speed versus motor torque curve 16 of the motor 10, the maximum actual phase current required is denoted by 46 on the graph of actual phase current 30.

In the first implementation, the motor controller 18 must supply the maximum actual phase current 46 to the motor 10 when the motor 10 is operating in full current/torque mode. When the motor 10 operates in a reduced current/torque mode, the motor controller 18 must supply a percentage of the maximum phase current 46 to the motor 10. The speed at which the motor 10 operates while providing the maximum torque required 44 while the motor controller 18 supplies the maximum actual phase current 46 initially defines the transition motor speed 22 of the motor 10. The transition motor speed 22 may be modified by iterating steps a) through c) to account for various design parameters of the motor 10 and the application requirements of the motor 10.

In the first implementation, typically, the transition motor speed 22 of the motor 10 occurs when the percent of the transient recirculating current time with respect to the time duration of each commutation state begins to become significant. Above the transition motor speed 22 of the motor 10 in the first quadrant 12 or the third quadrant 14 of a motor speed verses motor torque curve 16 of the motor 10, the motor speed 24 continues to increase while the motor torque and the current which must be supplied by the motor controller 18 decrease. Above the transition motor speed 22, the motor controller 18 reduces the requested phase current 48 which is used for closed loop control comparison with the measured phase current 54 to supply the actual phase current 30 to the motor 10 without degrading the performance of the motor speed versus motor torque curve 16 of the motor 10 in the first quadrant 12 or the third quadrant 14. In one variation, different reductions of the same requested phase current may be determined for different motor speeds above the transition motor speed 22 in step b) for any quadrant 12, 26, 14 and 28.

A second implementation of an example of the method of the invention uses the motor speed versus motor torque curve 16 of the motor 10 in FIG. 2 and the application requirements of the motor 10 to determine the transition motor speed 22 in step a). The second implementation uses the same transition motor speed 22 in the first quadrants 12 and the third quadrant 14 (e.g., the transition motor speed 22 is determined in the first quadrant 12 and is considered to be the same for the third quadrant 14) while using a different transition motor speed 22 in the second quadrant 26 and the fourth quadrant 28 (e.g., the different transition motor speed 22 is determined in the second quadrant 26 and is considered to be the same for the fourth quadrant 28). In one enablement of the second implementation, the motor controller 18 may not use any transition motor speed 22 in the first quadrant 12 and the third quadrant 14. The second implementation may require a more complex motor controller 18, but may improve the compensation of the measured phase current 54 provided by the single current sense resistor 20 to reduce the actual phase current 30. In one variation, different reductions of the same requested phase current may be determined for different motor speeds above the transition motor speed 22 in step b) for any quadrant 12, 26, 14 and 28.

A third implementation of an example of the method of the invention uses the motor speed versus motor torque curve 16 of the motor 10 in FIG. 2 and the application requirements of the motor 10 to determine the transition motor speed 22 in step a). The third implementation uses a different transition motor speed 22 in the first quadrant 12, the second quadrant 26, the third quadrant 14, and the fourth quadrant 28. The third implementation may require a more complex motor controller 18, but may improve the compensation of the measured phase current 54 provided by the single current sense resistor 20 to reduce the actual phase current 30. In one variation, different reductions of the same requested phase current may be determined for different motor speeds above the transition motor speed 22 in step b) for any quadrant 12, 26, 14 and 28.

In a modification of an example of the method of the invention, a transition motor speed 22 is not determined (and the requested phase current 48 is never reduced) in one, two or three of the quadrants 12, 26, 14 and 28. In the same or a different modification, the motor controller 18 uses the same transition motor speed 22 in at least two of the four quadrants 12, 26, 14 and 28.

A first enablement of an example of the method of the invention to determine the current control modification manner in step b) of the motor controller 18 uses the same current control modification manner in all four quadrants 12, 26, 14, and 28 to reduce the requested phase current 48 provided to the motor controller 18 when the motor speed 24 is above the transition motor speed 22 of the motor 10. Using the same current control modification manner of the motor controller 18 may simplify the motor controller 18. In one variation, the same current control modification manner may be continuously applied to the requested phase current 48. In another variation, the same current control modification manner may be applied to the requested phase current 48 for a limited time following each commutation event. This other variation may require a more complex motor controller 18, but may improve the compensation of the measured phase current 54 provided by the single current sense resistor 20 to reduce the actual phase current 30.

In the first enablement, above the transition motor speed 22, the error between the measured phase current 54 provided by the single current sense resistor 20 to the motor controller 18 and the actual phase current 30 of the motor 10 increases as the motor speed 24 increases. The current control modification manner of the motor controller 18 may be chosen such that the performance of the motor speed versus motor torque curve 16 of the motor 10 is not degraded in the first quadrant 12 or the third quadrant 14 since the same current control modification manner is used in all four quadrants 12, 26, 14 and 28. In one variation, the current control modification manner of the motor controller 18 may at least slightly degrade the performance of the motor speed versus motor torque curve 16 of the motor 10 in the first quadrant 12 or the third quadrant 14 provided the operation of motor 10 sufficiently maintains the application requirements of the motor 10.

In the first enablement, since inaccuracy between the measured phase current 54 provided by the single current sense resistor 20 to the motor controller 18 and the actual phase current 30 of the motor 10 is amplified in the second quadrant 26 and the fourth quadrant 28, the current control modification manner of the motor controller 18 reduces the requested phase current 48 in the second quadrant 26 and the fourth quadrant 28 to compensate for the difference between the measured phase current 54 and the actual phase current 30. By reducing the requested phase current 48 the compensation allows the motor controller 18 to more correctly control the actual phase current 30 of the motor 10 in step c) using a closed loop control comparison between the reduced requested phase current 50 and the measured phase current 54 above the transition motor speed 22.

In the first enablement, an intent of the more accurate control of the actual phase current 30 in the motor 10 is to reduce the magnitude of the actual phase current 30 such that the motor 10 is protected from demagnetization of the permanent magnets while the motor 10 and the motor controller 18 are protected from excessive thermal stress and the like. Since the same current control modification manner of the motor controller 18 is used in all four quadrants 12, 14, 26, and 28, the motor controller 18 may not sufficiently compensate for the difference between the measured phase current 54 provided by the single current sense resistor 20 and the actual phase current 30 of the motor 10 to reduce the actual phase current 30 to a safe magnitude in the second quadrant 26 and the fourth quadrant 28 while not degrading the performance of the motor speed versus motor torque curve 16 of the motor 10 in the first quadrant 12 and the third quadrant 14.

In a first example of the first enablement, the requested phase current 48 is reduced in step b) by a step change reduction to produce the reduced requested phase current 50 when the motor speed 24 is above the transition motor speed 22. When the motor 10 operates above the transition motor speed 22, the motor controller 18 generates the reduced requested phase current 50 by multiplying the requested phase current 48 by a constant value less than 100%. Using a single step change reduction may simplify the motor controller 18, but the motor controller 18 may not sufficiently compensate for the difference between the measured phase current 54 provided by the single current sense resistor 20 to reduce the actual phase current 30 to a safe magnitude in the second quadrant 26 and the fourth quadrant 28 while not degrading the motor speed versus motor torque curve 16 of the motor 10 in the first quadrant 12 and the third quadrant 14. In one variation, multiple step change reductions are applied with the magnitude of the constant value decreasing as the motor speed 24 increases above the transition motor speed 22. In one illustration, a table of values is used for the reduction of the requested phase current 48 for values of motor speed 24. In one variation, the table is obtained from a motor speed test of a same-model motor equipped with a single current sense resistor to obtain measured phase current 54 and equipped with three current sense resistors to obtain the actual phase current 30.

In a second example of the first enablement, the requested phase current 48 is reduced in step b) by a mathematical calculation to produce the reduced requested phase current 50 when the motor speed 24 is above the transition motor speed 22. When the motor 10 operates above the transition motor speed 22, the motor controller 18 generates the reduced requested phase current 50 by functional relationship to the requested phase current 48 such that the reduced requested phase current 50 equals f (requested phase current 48). Using a mathematical calculation may require a more complex motor controller 18, but will improve the compensation of the measured phase current 54 provided by the single current sense resistor 20 to reduce the actual phase current 30. In one variation, a linear relationship reduction is calculated between the requested phase current 48 and the reduced requested phase current 50 as the motor speed 24 increases above the transition motor speed 22.

A second enablement of an example of the method of the invention to determine the current control modification manner in step b) of the motor controller 18 uses the same current control modification manner in the first quadrant 12 and the third quadrant 14 while using a different current control modification manner in the second quadrant 26 and the fourth quadrant 28 to reduce the requested phase current 48 provided to the motor controller 18 when the motor speed 24 is above the transition motor speed 22. In one example, the motor controller 18 may not provide any current control modification manner in the first quadrant 12 and the third quadrant 14. The second enablement may require a more complex motor controller 18, but may improve the compensation of the measured phase current 54 provided by the single current sense resistor 20 to reduce the actual phase current 30. In one variation, the current control modification manner may be continuously applied to the requested phase current 48. In another variation, the current control modification manner may be applied to the requested phase current 48 for a limited time following each commutation event. This other variation may require a more complex motor controller 18, but may improve the compensation of the measured phase current 54 provided by the single current sense resistor 20 to reduce the actual phase current 30.

A third enablement of an example of the method of the invention to determine the current control modification manner in step b) of the motor controller 18 uses a different current control modification manner in the first quadrant 12, the second quadrant 26, the third quadrant 14, and the fourth quadrant 28 to reduce the requested phase current 48 provided to the motor controller 18 when the motor speed 24 is above the transition motor speed 22. In one example, the motor controller 18 may not provide any current control modification manner in one, two or three of the four quadrants 12, 26, 14, and 28. In another example, the motor controller 18 may provide the same current control modification manner in at least two of the four quadrants 12, 26, 14, and 28. The third enablement may require a more complex motor controller 18, but may improve the compensation of the measured phase current 54 provided by the single current sense resistor 20 to reduce the actual phase current 30. In one variation, the current control modification manner may be continuously applied to the requested phase current 48. In another variation, the current control modification manner may be applied to the requested phase current 48 for a limited time following each commutation event. This other variation may require a more complex motor controller 18, but may improve the compensation of the measured phase current 54 provided by the single current sense resistor 20 to reduce the actual phase current 30.

Figure 4:
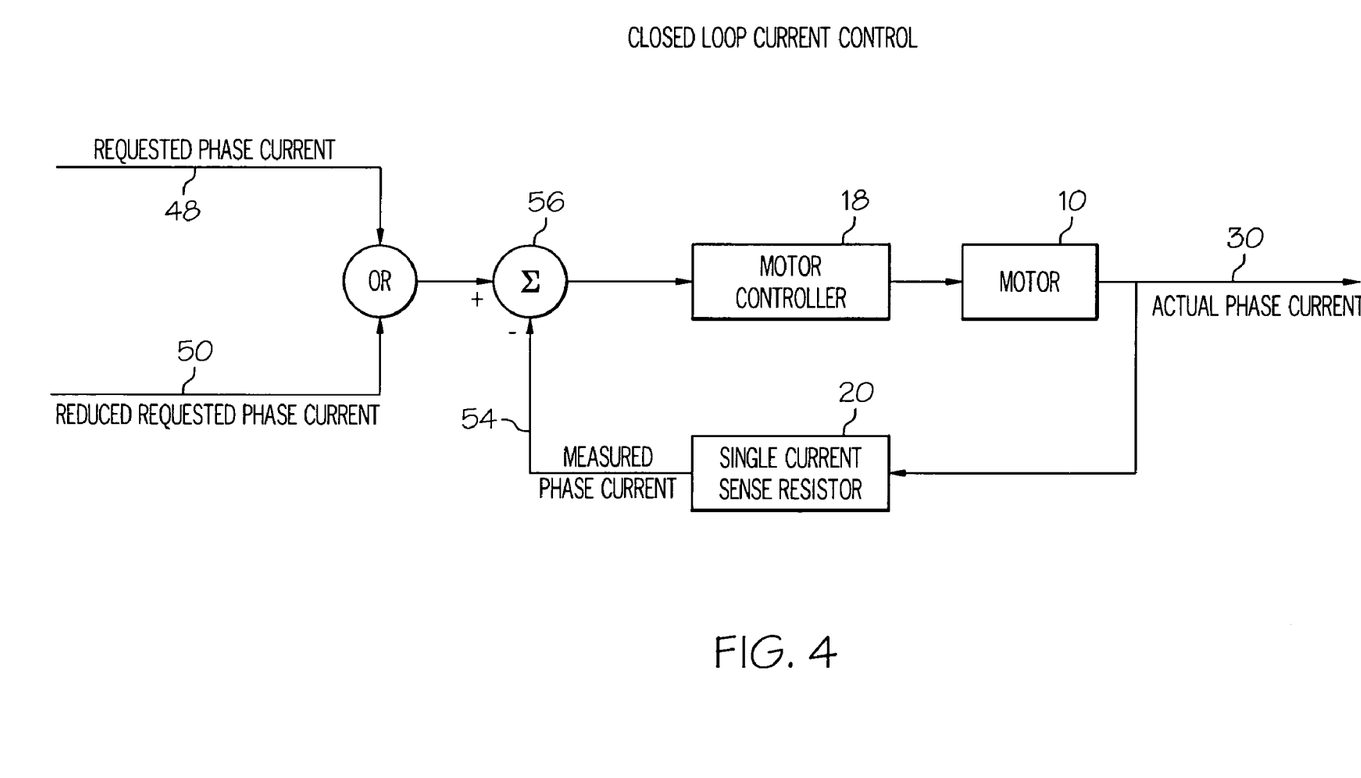
FIG. 4 is a block diagram of an example of a closed loop current control for the motor of FIG. 1.

FIG. 4 illustrates an example of a closed loop current control of step c) utilized in the method of this invention. As described herein, an arrangement of this invention includes a summing junction 56 and the single current sense resistor 20 which may, in one construction, be part of the motor controller 18. The method of the invention to control the actual phase current 30 of the motor 10 in the first quadrant 12 or the third quadrant 14 or the second quadrant 26 or the fourth quadrant 28 of a motor speed versus motor torque curve 16 of the motor 10 in step c) uses, in a first realization of the method, the transition motor speed 22 determined by one of the implementations of step a) and the current control modification manner determined by one of the enablements of step b).

In the first realization of the method, the intent of step c) is to control the motor 10 in a manner to meet the application requirements of the motor 10 in an application environment. However, step c) may be operated in a laboratory environment on a motor dynamometer to iterate steps a) through c) in order to verify that the transition motor speed 22 in step a) and the current control modification manner in step b) are chosen properly such that the motor speed versus motor torque curve 16 of the motor 10 does not degrade over the operating conditions of at least operating voltage of the motor 10 in all four quadrants 12, 26, 14, and 28 while reducing the actual phase current 30 of the motor 10 to safe levels to prevent demagnetization of the motor 10 and thermal stress of the motor 10 and the motor controller 18 in all four quadrants 12, 26, 14, and 28 (and particularly in the second quadrant 26 and the fourth quadrant 28). In the situation where a motor dynamometer capable of four quadrant operation is not available, the motor 10 can operate with an inertia attached to the shaft while monitoring actual phase current 30 during motor reversals from maximum free speed 42 of the motor 10.

In the first realization of the method, when the motor 10 operates at a motor speed 24 below the transition motor speed 22 of step a), the motor controller 18 receives the requested phase current 48 from a user request, a higher level control loop, or the like and supplies the motor 10 with the actual phase current 30 based upon a closed loop control comparison between the requested phase current 48 and the measured phase current 54 provided by the single current sense resistor 20. The method of implementation for the closed loop control comparison below the transition motor speed 22 may be any well known control method such as a proportional-integral (PI) control, a proportional-integral-derivative (PID) control, a sliding mode control, or the like.

In the first realization of the method, when the motor 10 operates at a motor speed 24 above the transition motor speed 22 of step a), the motor controller 18 first receives the requested phase current 48 and determines a reduced requested phase current 50 by reducing the requested phase current 48 using the current control modification manner determined in step b). The motor controller 18 then supplies the motor 10 with the actual phase current 30 based upon a closed loop control comparison between the reduced requested phase current 50 and the measured phase current 54 provided by the single current sense resistor 20. The method of implementation for the closed loop control comparison above the transition motor speed 22 may be any well known control method such as a proportional-integral (PI) control, a proportional-integral-derivative (PID) control, a sliding mode control, or the like.

In one variation of the first realization of the method, when the motor 10 operates at a motor speed 24 equal to the transition motor speed 22, the motor controller 18 supplies the motor 10 with the actual phase current 30 based upon a closed loop comparison between the reduced requested phase current 50 and the measured phase current 54 provided by the single current sense resistor 20. In another variation when the motor 10 operates at a motor speed 24 equal to the transition motor speed 22, the motor controller 18 supplies the motor 10 with the actual phase current 30 based upon a closed loop comparison between the requested phase current 48 and the measured phase current 54 provided by the single current sense resistor 20.

In one embodiment of the method of the invention, the motor 10 operating in the first quadrant 12 produces 0.9 Nm of motor torque at 40 amps of actual phase current 30. Assume that the application requirements of the motor 10 specify that the motor 10 must produce a maximum torque required 44 of 0.9 Nm. From the motor speed versus motor torque curve 16 of the motor 10, the maximum actual phase current required 46 is noted as 40 amps on the graph of actual phase current 30. The application requirements of the motor 10 may also specify the actual phase current 30 which will cause demagnetization of the magnets of the motor 10 as a number greater than the maximum actual phase current required 46 to provide some safety margin (for example 60 amps).

Once the motor reaches 3500 RPM (which in this embodiment is the transition motor speed 22), the back emf (back electromotive force) has increased to the point where it is not possible to sustain 40 amps in the windings of the motor 10 in the first quadrant 12 or the third quadrant 14. The motor speed in the first quadrant 12 continues to increase up to 6300 RPM while the motor torque and the actual phase current 30 decrease to zero. In this embodiment, when the motor 10 operates in the first quadrant 12 at a particular motor speed value 32 (assume 4000 RPM) greater than the transition motor speed 22 of 3500 RPM, the actual phase current 30 will not exceed the corresponding particular actual phase current value 34 (assume 35 amps) in the first quadrant 12 because the actual phase current 30 equals (battery voltage minus back emf) divided by motor resistance. At the particular motor speed value 32, the motor controller 18 may reduce the requested phase current 48 of 40 amps using the current control modification manner to achieve a reduced requested phase current 50 of 35 amps without degrading the motor speed versus motor torque curve 16 of the motor 10 in the first quadrant.

In this embodiment, when the motor 10 operates in the second quadrant 26 at a similar motor speed of 4000 RPM, which is above the transition motor speed 22 of 3500 RPM, the actual phase current 30 of the motor 10 may, without step c) of the method, exceed the maximum phase current required 46 of 40 amps because the actual phase current 30 equals (battery voltage plus back emf) divided by motor resistance in the second quadrant 26 (assume 45 amps because of the additive back emf and battery voltage). To improve the control of the actual phase current 30 of the motor 10, the motor controller 18, in step c) of the method, uses the reduced requested phase current 50 value of 35 amps to supply the actual phase current 30 to the motor 10 using a closed loop comparison between the reduced requested phase current 50 and the measured phase current 54 provided by the single current sense resistor 20. Using the reduced requested phase current 50 above the transition motor speed 22 allows the motor controller 18 to account for the difference caused by commutation of the motor 10 between the actual phase current 30 of the motor 10 and the measured phase current 54 provided by the single current sense resistor 20 to maintain an actual phase current 30 of the motor 10 at 40 amps instead of the possible 45 amps in the second quadrant 26.

Several benefits and advantages are derived from the method of the invention. In one example, reducing the requested phase current of the motor controller, when the delta wound three-phase permanent magnet brushless motor is operating in the second or fourth quadrant at a particular motor speed above the transition motor speed, reduces the possibility for demagnetization of the permanent magnets of the rotor of the motor. In the same or a different example, reducing the requested phase current of the motor controller, when the delta wound three-phase permanent magnet brushless motor is operating in the second or fourth quadrant at a particular motor speed above the transition motor speed, reduces the possibility for causing excessive thermal stress in the motor and the motor controller. In the same or a different example, having a motor controller which uses a single current sense resistor reduces the complexity and expense of motor current sensing.

The foregoing description of a method of the invention has been presented for purposes of illustration. It is not intended to be exhaustive or to limit the invention to the precise procedures and forms disclosed, and obviously many modifications and variations are possible in light of the above teaching. It is intended that the scope of the invention be defined by the claims appended hereto.

The invention claimed is:

1. A method for operating a delta wound three-phase permanent magnet brushless motor comprising the steps of:
   a) determining a transition motor speed of the motor in a quadrant of a motor speed versus motor torque curve of the motor above which motor speed continues to increase while motor current/torque decreases wherein actual phase current supplied to the motor can be controlled by a motor controller in a current control modification manner which reduces requested phase current for the motor;
   b) determining the current control modification manner for a quadrant of the motor speed versus motor torque curve, wherein the motor controller can use the current control modification manner to reduce the requested phase current to control the actual phase current when the motor speed is above the transition motor speed; and
   c) controlling the motor in a quadrant of the motor speed versus motor torque curve with the motor controller wherein, when the motor has a motor speed above the transition motor speed, the motor controller reduces the requested phase current in the current control modification manner and the motor controller supplies the actual phase current to the motor based upon closed loop control using the reduced requested phase current and using measured phase current of the motor derived from using a single current sense resistor.

2. The method of claim 1, also including step d), wherein step d) includes controlling the motor in a quadrant of the motor speed versus motor torque curve with the motor controller, wherein, when the motor has a motor speed below the transition motor speed, the motor controller supplies the actual phase current to the motor based upon closed loop control using the requested phase current and using the measured phase current.

3. The method of claim 2, also including step e), wherein step e) includes controlling the motor in a quadrant of the motor speed versus motor torque curve with the motor controller, wherein, when the motor has a motor speed equal to the transition motor speed, the motor controller supplies the actual phase current to the motor based upon closed loop control using the reduced requested phase current and using the measured phase current.

4. The method of claim 2, also including step e), wherein step e) includes controlling the motor in a quadrant of the motor speed versus motor torque curve with the motor controller, wherein, when the motor has a motor speed equal to the transition motor speed, the motor controller supplies the actual phase current to the motor based upon closed loop control using the requested phase current and using the measured phase current.

5. The method of claim 2, wherein the quadrant of step d) is the same as the quadrant of step c).

6. The method of claim 5, wherein the quadrant of step c) is the first quadrant.

7. The method of claim 5, wherein the quadrant of step c) is the second quadrant.

8. The method of claim 5, wherein the quadrant of step c) is the third quadrant.

9. The method of claim 5, wherein the quadrant of step c) is the fourth quadrant.

10. The method of claim 1, wherein the quadrant of step c) is the same as the quadrant of step b) and wherein the quadrant of step b) is the same as the quadrant of step a).

11. The method of claim 10, wherein the quadrant of step c) is the second or fourth quadrant but is not the first quadrant and is not the third quadrant.

12. The method of claim 1, wherein the quadrant of step c) is the same as the quadrant of step b) and wherein the quadrant of step c) is different from the quadrant of step a).

13. The method of claim 12, wherein the quadrant of step c) is the second or fourth quadrant but is not the first quadrant and is not the third quadrant.

14. The method of claim 1, wherein the quadrant of step c) is different from the quadrant of step b).

15. The method of claim 1, wherein the motor controller in step c) uses the reduced requested phase current only for a predetermined time substantially immediately following a motor commutation when the motor speed is above the transition motor speed.

16. The method of claim 1, wherein the motor controller in step c) uses the reduced requested phase current continuously when the motor speed is above the transition motor speed.

17. The method of claim 1, wherein the reduced requested phase current is the same for any quadrant for the same requested phase current, the same motor speed, and the same transition motor speed.

18. The method of claim 1, wherein the reduced requested phase current is the same for the second and fourth quadrants for the same requested phase current, the same motor speed, and the same transition motor speed.

19. The method of claim 1, wherein the reduced requested phase current is the same for the first and third quadrants for the same requested phase current, the same motor speed, and the same transition motor speed.

20. The method of claim 1, wherein the reduced requested phase current is different for each quadrant for the same requested phase current, the same motor speed, and the same transition motor speed.

* * * * *